United States Patent [19]

Haines

[11] Patent Number: 4,607,816

[45] Date of Patent: Aug. 26, 1986

[54] WINDOW BLIND FITTINGS

[75] Inventor: Richard K. Haines, Elkhart, Ind.

[73] Assignee: Elkhart Door Corporation, Elkhart, Ind.

[21] Appl. No.: 607,433

[22] Filed: May 7, 1984

[51] Int. Cl.⁴ .............................................. E06B 7/28
[52] U.S. Cl. ..................... 248/208; 16/382; 16/DIG. 13; 49/87; 248/201
[58] Field of Search ................ 49/62, 64, 67, 87; 160/178 R, 178 B; 16/255, 257, 382, DIG. 13; 248/208, 201

[56] References Cited

U.S. PATENT DOCUMENTS

| | | | |
|---|---|---|---|
| 1,894,730 | 1/1933 | Burns | 160/178 B |
| 2,210,624 | 8/1940 | Kramer | 49/62 |
| 2,305,562 | 12/1942 | Thompson et al. | 16/257 X |
| 2,349,470 | 5/1944 | Stanfield | 49/67 X |
| 2,393,819 | 1/1946 | Smith et al. | 160/178 R |
| 2,485,263 | 10/1949 | Digby | 49/87 |
| 2,574,729 | 11/1951 | Coffman | 49/87 X |
| 2,629,145 | 2/1953 | Parsson | 49/87 X |
| 2,643,712 | 6/1953 | Dunn | 160/178 R X |
| 2,677,129 | 5/1954 | Bigler | 16/257 X |
| 2,738,558 | 3/1956 | Davis | 160/178 R X |
| 2,901,035 | 8/1959 | Anderle | 160/178 R |
| 3,351,402 | 11/1967 | Miller et al. | 16/382 X |
| 3,447,586 | 6/1969 | Anderle | 160/178 R |
| 3,936,907 | 2/1976 | Jansons | 16/257 |
| 4,355,676 | 10/1982 | Lee | 49/62 X |
| 4,506,476 | 3/1985 | Hanes | 49/64 |

Primary Examiner—William E. Lyddane
Assistant Examiner—James R. Brittain, Jr.
Attorney, Agent, or Firm—Trexler, Bushnell & Wolters, Ltd.

[57] ABSTRACT

A window blind structure is provided for use in a vehicle such as a van. The window blind structure includes a fixed, upright channel, which is mounted to the window frame of a window in a van by means of upper and lower brackets or fittings. The upper bracket or fitting includes a channel-shaped cap embracing the upper end of the fixed channel of the window blind structure, and has an upstanding leg and an angularly disposed foot for securement to the frame of a van window. The lower or bottom fitting or bracket includes a channel-shaped body slidably interfitting with the lower end of the window blind fixed channel by means of protuberances or splines. Angularly disposed legs on the body may or may not be provided with depending feet. In any event, outwardly directed integral pins are provided for interfitting with a stirrup to be mounted flat against a wall surface of a van window frame.

3 Claims, 7 Drawing Figures

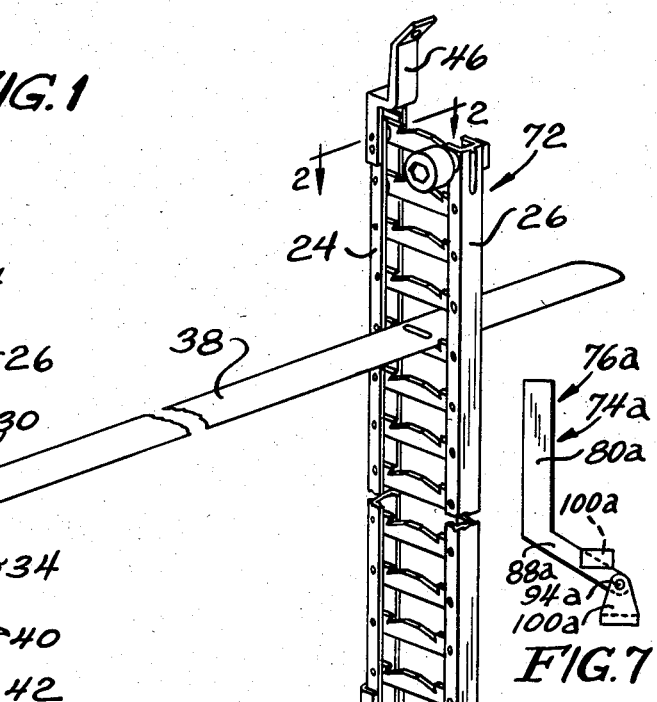

WINDOW BLIND FITTINGS

RELATED APPLICATION

The present application is related to my co-pending application Ser. No. 498,927 filed May 27, 1983 for VEHICULAR BLINDS, issued Mar. 26, 1985 as U.S. Pat. No. 4,506,476 the disclosure of which is incorporated herein by reference.

BACKGROUND OF THE INVENTION

In my aforesaid Pat. No. 4,506,476, I have disclosed a particular type of window blind especially adapted for use in vehicles such as vans. Conventional venetian blinds are suspended by flexible tapes and cords and are intended for stationary operations. Incorporation of such blinds in a moving vehicle would cause the blinds, from time to time, to strike the adjacent window or other portions of the vehicle with considerable force, such as upon turning, accelerating, or passing over rough pavement. This would be detrimental to the blinds and to the vehicle, and would tend to distract the driver with attendant danger.

In my aforesaid application, a window blind structure is disclosed and claimed in which thin metal slats are secured to supports extending between two relatively rigid vertical members, one of which is fixed, and the other of which is vertically movable to adjust the angle of the slats.

As will be appreciated, there is a large number of automotive manufacturers, both domestic and foreign, that manufacture vans. There is a like plurality of different window frames, which may change from year to year even for a given manufacturer. Furthermore, there are many custom installations. As a result, there is a very large number of different window frames in which vehicular window blinds may be mounted.

In my aforesaid Pat. No. 4,506,476, the window blind structure is mounted directly to the window itself, which is openable, whereby the edges thereof are accessible for mounting structure. However, not all van windows are openable, and even with openable windows, it is sometimes desirable for a window blind to be retained entirely within the vehicle, and not exposed to the wind currents which are inevitable when the window blind is mounted directly on the window itself.

OBJECTS AND SUMMARY OF THE INVENTION

It is an object of the present invention to provide fittings for a window blind, particularly a venetian blind having rigid structure, which are adaptable for mounting to the window frames of different vans.

More particularly, it is an object of the present invention to provide fittings for a vehicular window blind which are adaptable as to window frame size and angularity of structure.

Yet another object of the present invention is to provide venetian blind fittings for a vehicular window blind, which fittings are molded of a semi-flexible plastic, thereby affording shock absorbing properties.

In attaining the foregoing and other objects and advantages of the present invention, I provide an upper fitting for a vehicular window blind which is interchangeable as to size, and which interfits with the venetian blind structure in any of a plurality of positions. The foot or attaching flange portion of the fitting is flexible relative to the portion of the fitting that connects to the window blind structure, thereby adapting to various window frame structures, and individual production variations within a given window frame.

A bottom fitting also is provided which is vertically adjustable on the window blind structure for accommodating to different sizes of window frame. The bottom fitting also has a detachable stirrup to which the balance of the fitting is pivotably and detachably secured for permitting ready attachment of the stirrup to window frame structures of markedly different shapes.

THE DRAWINGS

The present invention will best be understood with reference to the ensuing specification and the accompanying drawings wherein:

FIG. 1 a fragmentary perspective view illustrating a vehicular window blind utilizing the fittings of the present invention;

FIG. 2 is a horizontal cross sectional view taken substantially along the line 2—2 in FIG. 1;

FIG. 3 is a horizontal cross sectional view taken substantially along the line 3—3 in FIG. 1;

FIG. 4 a front view of the bottom fitting of FIG. 1;

FIG. 5 a longitudinal sectional view through the upper fitting showing its attachment to a van window frame;

FIG. 6 a longitudinal sectional view through the bottom fitting showing its attachment to a van window frame; and FIG. 7 is a side view of a modified form of the bottom fitting.

DETAILED DISCLOSURE OF THE ILLUSTRATED EMBODIMENT

The vehicular window blind structure of my Pat. No. 4,506,476 is shown fragmentarily in FIG. 1 and comprises a pair of similar upright frame or support members 20 and 22, only one of which will be described in detail. Each frame or support member includes a fixed channel member or post 24 parallel to and facing an adjustable channel member or post 26. Both channel members are elongated and are molded of a suitable, semi-rigid, resinous plastic. Both channel members are provided in both side flanges with a plurality of vertically spaced apertures 28 and 30, which receive integral pivot pins on a plurality of slat supports 32. The slat supports are substantially horizontal, as shown in FIG. 1, and each includes an arched center section having an upstanding flange 34 received in a corresponding slot 36 of a thin sheet metal slat 38. The slat is held down on the flange 36 by having the edges thereof fit beneath inward protuberances 40. The protuberances 40 form notches 42 in which the edges of the slats seat. Only one slat 38 is shown, but it will be understood that a plurality of such slats is provided, one for each slat support 32.

The uppermost slat support 32 is not provided with an integral pivot pin for cooperation with the channel 26, but instead is provided with a straight through bore. A stud and nut assembly 44 is provided at this point for retaining the upper support in the channel 26. The nut can be loosened on the stud to permit up and down movement of the channel 26 of both upright frame members or supports 20, 22 to permit adjusting the angle of the slats 38. Subsequent tightening of the nuts 44 on the cooperating studs locks the structure in adjusted position. The foregoing constitutes the portion of my Pat. No. 4,506,476, which is carried over into this specification, and more specific details can be ascertained from my aforesaid co-pending application.

Each fixed upright channel 24 is provided at its upper end with a top or upper fitting or bracket 46, as seen in FIGS. 1, 2 and 5. Each such bracket includes a cap portion 48 comprising a relatively thick web 50 and a pair of side flanges 52. The flanges adjacent their free edges are chamfered at the inner surfaces, as indicated at 54. The fittings or brackets 46 are molded of a semi-flexible plastic material, and the molding and curing process is such that the flanges 52 initially are not quite parallel, but converge slightly toward one another, outwardly of the web 50. Accordingly, when the brackets are assembled with the channels 24, they aggressively grip the channels, specifically the flanges 52 thereof tightly grip the corresponding flanges of the upright supports or fixed channels 24.

The side flanges of the channels 24 adjacent the upper ends thereof are provided with integral, outwardly extending pins 56. The flanges 52 are each provided with a vertically spaced pair of openings 58. The pins 56 can be received in either the upper or lower of the pairs of openings 58 to provide a vertical adjustment of the position of the fitting or bracket 46 relative to the channel 24.

The top of each cap 48 of the bracket or fitting 46 is closed by a top wall 60. This renders the top portion of each cap somewhat more rigid, while leaving the lower portions thereof sufficiently flexible for the flanges 52 to pass over the pins 56, aided by the chamfered surfaces 54. Each top wall 60 extends forwardly beyond the flanges 52 to a thickened root 62, integrally joined to an upstanding connecting leg 64 of thinner construction than the top wall 60 and web 50, and of about the same thickness, or slightly thicker than, the flanges 52, thereby being somewhat flexible. A foot 66 is integrally formed with the leg 64 at an obtuse angle thereto and is of somewhat greater thickness, thereby being more rigid than the leg 64. The foot 66 is provided with a central aperture 68. The foot 66 is pressed flat against a surface 70 (FIG. 5) forming a part of the frame surrounding a van window in which the venetian blind is to be mounted. A hole is drilled in the frame wall 70, and a screw 72 is passed through the aperture 68 in the foot and threaded into the hole in the frame wall, which hole is somewhat smaller than the diameter of the screw 72 to form a tight fit therewith. The screw 72, for example, may be a sheet metal screw for efficient cooperation with the molded plastic material of the wall 70.

Each vertical upright channel 24 also is provided with a lower or bottom fitting or bracket 74. Each fitting or bracket 74 includes an upstanding body 76 comprising a web 78 and a pair of side flanges 80, which are somewhat thicker than the web 78. Again, the molding and curing process is such that the flanges 80 tend to converge with one another outwardly of the web 78 before association with the channel 24.

The lower portion of each channel is provided with an elongated protuberance or spline 82 extending along the longitudinal center line of the outer face of the web. Generally similar elongated protuberances or splines 84 are provided along the outer faces of the flanges of the channel 24 relatively adjacent to the web 78. The body flanges 80 are provided with elongated internal slots 86, which slidingly receive the protuberances 84 with the protuberances pressing against the forward edges of the slots 86. The protuberance 82 abuts the inner surface of the web 78 aggressively to maintain this contact of the protuberances 84 within the slots 86. Accordingly, the body 76 of the fitting or bracket 74 is longitudinally adjustable along the channel 24, but tends to stay in the position in which it is placed.

A pair of legs 88 extends at an obtuse angle from the lower end of the body 76, being co-planar with the flanges 80. Relatively adjacent the upper ends thereof, an integral strut 90 extends between the legs 88 to maintain the parallel spacing thereof. At the lower ends, the legs are provided with vertically directed feet 92, having outwardly directed, aligned integral pins 94. The pins are respectively received in openings 96 in the side arms or flanges 98 of a stirrup 100. This stirrup is molded of the same semi-rigid plastic as the parts heretofore enumerated, and the side flanges 98 are interconnected by an integral web 102, having a central opening 104 through which a screw 106 is passed and threaded into a hole in a wall 108 of the window frame.

Finger pieces 110 are provided on the outer surfaces of the feet substantially at the junction with the legs to permit inward flexing of the feet 92 and the lower portions of the legs 88 to permit insertion and withdrawal of the pins 94 relative to the openings 96.

With the construction as described, the web 102 of the stirrup 100 is readily placed against the wall 108, and the position marked for the screw hole in the wall 108. The lower bracket or channel 74 then readily can be raised somewhat up the channel 24, and the stirrup detached from the feet to provide clearance for drilling the hole in the wall 108, and for inserting the screw in the stirrup. Subsequently, the fitting or bracket 74 is again lowered, the finger pieces 110 are pressed on by the thumb and forefinger, and the feet are flexed to bring the pins 94 into association with the openings 96.

It will be appreciated that the upper brackets or fittings 46 determine the vertical position of the channels 24, according to which of the holes 58 receive the pins 56. The vertical adjustability of the bottom or lower fittings or brackets 74 on the channels assures fitting of the lower bracket with the window frame wall 108. Differences in vertical height are easily taken up as between one van or another, and as may be further brought about by warping of the window frame wall 108, etc. The pivotal interconnection of the lower or bottom bracket 74 with the stirrup 100 insures proper conformity of the stirrup web 102 with the wall 108.

A modification of the lower or bottom fitting or bracket is shown in FIG. 7, in which similar parts are identified by similar numerals with the addition of the suffix a. The essential difference is that the legs 88a do not have any depending vertical feet, the pins 94a for association with the stirrup 100a being disposed on the lower ends of the legs. The finger pieces 100a are disposed on the legs 88a, somewhat up from the bottom ends thereof.

In addition to the elimination of the depending feet in FIG. 7, it is contemplated that the feet, when provided, could be of different lengths for different installations. In the same manner, the upper fittings or brackets may have legs 64 of different lengths, and the feet 66 may be oriented at different angles with respect to the legs.

The specific examples of the invention as herein shown and described are for illustrative purposes. Various changes will no doubt occur to those skilled in the art, and will be understood as forming a part of the present invention insofar as they fall within the spirit and scope of the appended claims.

The invention is claimed as follows:

1. Installation structure for mounting a window blind structure in a window frame of a vehicle such as a van, which window blind structure includes an upright post having upper and lower ends, said installation structure comprising a first bracket of molded plastic material mounted on the upper end of said post, said first bracket being channel-shaped and having a pair of spaced flanges and an interconnecting web and substantially embracing said upper end of said post, said first bracket and said upper end of said post having cooperating means securing said first bracket on said upper end of said post, there being a top wall spanning and integral with said web and said flanges and extending forwardly of said flanges, said top wall forwardly of said flanges having an integral leg extending upwardly therefrom and angularly disposed foot means thereon for mountign aganist a window frame surface, a second bracket of molded plastic material mounted on the lower end of said post, said second bracket being channel-shaped and having a pair of spaced flanges and an interconnecting web and substantially embracing said lower end of said post, said second bracket and said lower end of said post having cooperating means securing said second bracket on said lower end of said post, and a member pivotally secured to said second bracket for mounting against another window frame surface.

2. Installation structure for mounting a window blind structure in a window frame of a vehicle such as a van, which window blind structure includes an upright post having upper and lower ends, sid installation structure comprising a first bracket of molded plastic material mounted on the upper end of said post, said first bracket being channel-shaped and having a pair of spaced flanges and an interconnecting web and substantially embracing said upper end of said post, said first bracket and said upper end of said post having cooperating means securing said first bracket on sid upper end of said post, said first bracket having means thereon for mounting against a window frame surface, a second bracket of molded plastic material mounted on the lower end of said post, said second bracket being channel-shaped and having a pair of spaced flanges and an interconnecting web and substantially embracing said lower end of sid post, said second bracket and said lower end of said post having cooperating means securing said second bracket on said lower end of said post, and a member pivotally secured to said second bracket for mounting against another window frame surface, said second bracket having depending legs angling downwardly and forwardly from said flanges, said legs and said pivotally secured member having interconnecting pin and hole means, and said flanges being resiliently yieldable to permit initial assembly of said pin and hole means.

3. Installation structure as set forth in claim 2 wherein said second bracket flange having elongated interior recesses and said post lower end has splines received therein permitting vertical relative adjustment of said post and said second bracket.

* * * * *